Jan. 3, 1939.  H. E. LACY  2,142,852
ELECTRICAL SELF-HEATING CUP
Filed Jan. 17, 1938
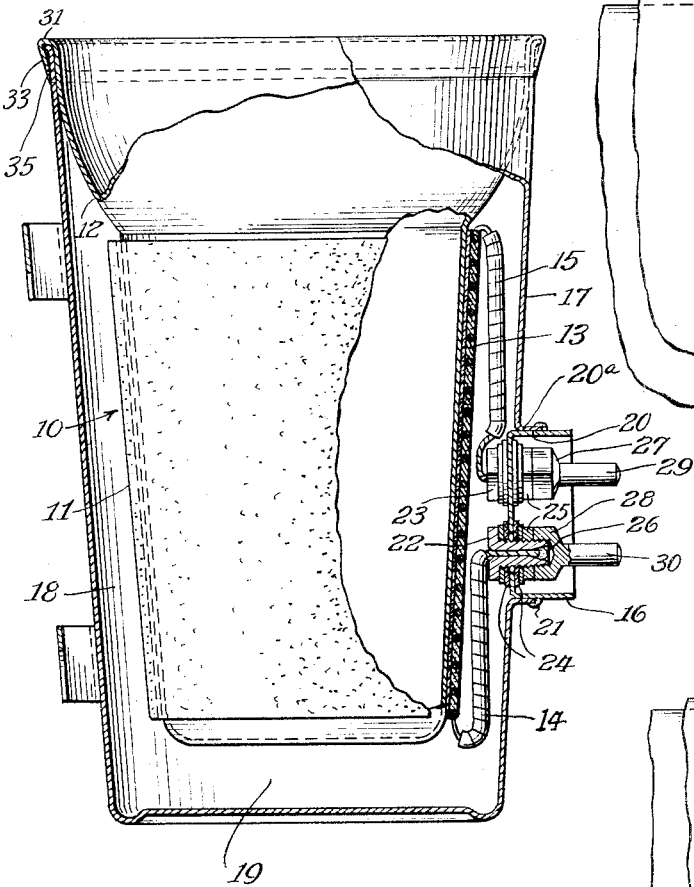
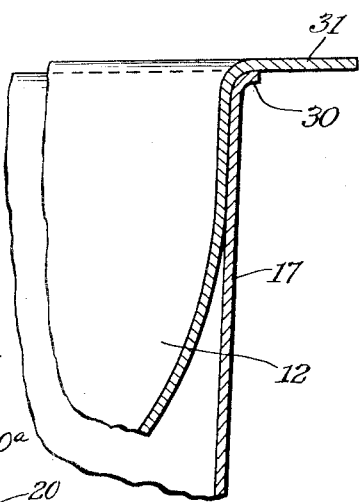
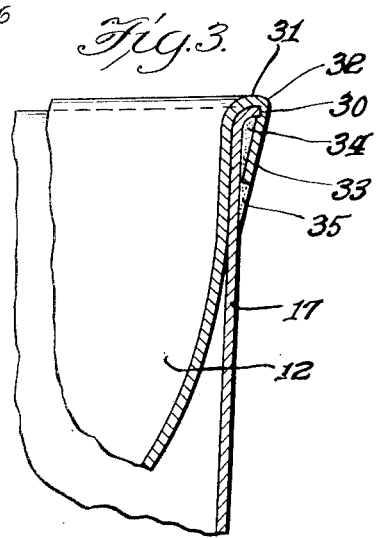
Inventor
Herman E. Lacy
By
Atty.

Patented Jan. 3, 1939

2,142,852

UNITED STATES PATENT OFFICE 2,142,852

ELECTRICAL SELF-HEATING CUP

Herman E. Lacy, Chicago, Ill.

Application January 17, 1938, Serial No. 185,386

3 Claims. (Cl. 219—44)

This invention relates to an electrical self-heating cup or container, and has for its object to provide a unit in which all possibility of explosion therewithin is eliminated, thereby producing an electric cup which is safe to operate.

Electric heating cups of the present day construction have one serious disadvantage in that the manner of securing the inner container to the outer shell is such that the two will not remain permanently secured together to withstand explosive action. This has resulted in many serious accidents. It is known that the operator frequently neglects to turn off the electric current after the contents of the container have been emptied or when the contents have boiled out and that as the unit is thus operated the excess heat will cause pressure to be built up in the space between the container and shell to cause an explosion and to tear the container from the shell with disastrous results. The operator's attention is not called to the fact that the cup is heating while dry and consequently unless the operator is continuously watching the unit while in operation it is impossible for him to prevent the condition hereinabove mentioned. It is one of the objects of my invention to eliminate the foregoing objectionable features.

Another object of my invention is to provide an electric self-heating container in which the inner cup and outer shell are united together so as to prevent a separation therebetween during all conditions of operation of said container.

Another object of my invention is to provide a manner of uniting the container and shell of an electric self-heating cup, which will resist separation therebetween.

Another object is to provide an electric self-heating container which is strong and durable and which will withstand explosive action.

Another object is to provide an electric self-heating container in which the excess pressure built up within said unit will escape without effecting a separation of the parts.

Other objects will become apparent as this description progresses.

Fig. 1 is a cross sectional view of the electrical heating cup showing my invention;

Fig. 2 is an enlarged cross sectional view showing the position of the flange of the container prior to its being secured in its fully closed position;

Fig. 3 is an enlarged cross sectional view showing my manner of uniting the container with the outer shell.

In the drawing is shown an inner container or shell 10 having a lower portion 11 and a flared out portion 12. Surrounding the portion 11 is a heating element 13, preferably of an electrical heating resistance. The terminals 14 and 15 of said heating element lead to and are secured in a socket 16 supported on the outer shell 17. As shown the container 10 is mounted within the outer shell 17 and is secured thereto adjacent the rim or top portion in accordance with my invention more presently to be described. The container 10 is spaced from the outer shell 17 to provide intervening air spaces 18 and 19 for the purpose of insulating the heat from the outer shell 17.

In the outer shell 17 I provide an opening 20, which is flanged adjacent thereto as at 20A. Seated within said opening is the socket 16 which is secured to said flange by a bead of solder 21 which extends completely around said socket to seal it to the shell.

Mounted on said socket are a pair of identically constructed members 22 and 23 which have internal passages for receiving the free ends of the terminals 14 and 15 of the heating element. Mica washers 24 are employed for insulating the members 22 and 23 from the socket, while the nuts 25 are used for holding the members 22 and 23 in place. The members have enlarged openings adjacent the outer ends to permit solder 26 to be used for securing the free ends of the terminals within their respective members. To close the members 22 and 23, I provide suitable threaded caps 27 and 28 which are threaded to the members 22 and 23. Said caps having projection prongs 29 and 30 which are adapted for reception in the plug (not shown), when the plug is disposed in the socket.

Referring now more particularly to the manner of uniting the container and outer shell so as to carry out the objects of my invention, I provide an out-turned flange or lip 30 adjacent the rim or upper portion of the outer shell, which lip is substantially at right angles to the vertical axis of the shell. This lip can best be formed by spinning and is formed prior to insertion of the container 10 within the shell. Also I form a horizontal flange 31 (shown more particularly in Figure 2) on the upper portion of the container 10, and with the flange in this position insert the container within the shell 17. The horizontal flange is next bent over and spun to assume the position shown in Figures 1 and 3 in which a portion of said flange will over-lap the flange 30 as at 32 and the balance of said flange will extend downwardly as at 33 on an inclined angle. By bending and spinning the flange in this manner, a space 34 is defined between the shell and the bent-over flange of the container and further the flange 30 is so enclosed within the flange 31 that any separation therebetween is impossible. I next solder the flange 33 to the shell as at 35 and permit some of the solder to fill space 34 to form a more effective seal. The surplus solder is removed so that the solder will extend on a plane with the inclined flange 33.

With my manner of uniting the shell and container, I have provided a self-heating cup in which any explosion which might be caused by the negligent operation of the unit is eliminated. Assuming the standard container as used prior to my invention or operated while dry as originally explained, the heat would cause a pressure to be built up in the spaces 18 and 19 sufficiently strong to cause an explosion and tear the container from the shell. However, with my invention, this is impossible for the reason that the flanges are united together in such a manner as to resist and withstand any explosion and further said flanges will remain connected together regardless of any pressure built up between said shell and said container. Thus all possibility of causing an explosion between said parts is eliminated. As the cup continues to be heated, the heat will melt the solder 21 around the socket and permit the pressure between the shell and container to escape. The breaking of the seal around the socket acts as a safety valve for the release of the built up pressure and further signals that the cup has been operated negligently and is damaged and needs repairs. It will be noted that various modifications and changes can be made without detaching from the spirit and scope of my invention.

What I desire to secure by Letters Patent is:

1. In a self heating cup comprising an outer shell having an outwardly directed flange rim substantially at right angles to the vertical axis of said shell, an inner container, an electrical heating element for heating said container, said container having its upper portion resting adjacent the outer shell, said inner container having an annular flanged rim arranged to overlie said outer shell rim and bent reversely at an angle to the vertical axis of said outer shell so as to completely enclose said outer shell rim, the reversely bent portion of said annular flanged rim arranged to permit separation of the inner and outer shells from each other without permanent distortion of any part of said shells, the edge of said container flanged rim resting adjacent said outer shell.

2. In a self heating cup comprising an outer shell having an annular outwardly directed flange rim substantially at right angles to the vertical axis of said shell, an inner container, an electric heating element for heating said container, said inner container having its upper portion resting adjacent said outer shell, said inner container having an annular flanged rim adapted to overlie said outer shell rim and bent reversely to completely enclose said outer shell rim with the edge of said container rim resting adjacent said outer shell, the reversely bent portion of said annular flanged rim arranged to permit separation of the inner and outer shells from each other without permanent distortion of any part of said shells.

3. In a self heating cup comprising an outer shell having an annular outwardly directed flange rim at substantially right angles to the vertical axis of said shell, an inner container, an electrical heating element for heating said container, said container having its upper portion resting adjacent said outer shell, said container having an annular flanged rim adapted to overlie said outer shell rim and bent reversely to completely enclose said outer shell rim and define a space between said flanged rim and said outer shell and soldering means adapted to fill said space, the reversely bent portion of said annular flanged rim arranged to permit separation of the inner and outer shells from each other without permanent distortion of any part of said shells.

HERMAN E. LACY.